US010769071B2

(12) United States Patent
Finkbeiner et al.

(10) Patent No.: US 10,769,071 B2
(45) Date of Patent: Sep. 8, 2020

(54) COHERENT MEMORY ACCESS

(71) Applicant: Micron Technology, Inc., Boise, ID (US)

(72) Inventors: Timothy P. Finkbeiner, Boise, ID (US); Troy D. Larsen, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 37 days.

(21) Appl. No.: 16/156,654

(22) Filed: Oct. 10, 2018

(65) Prior Publication Data

US 2020/0117609 A1 Apr. 16, 2020

(51) Int. Cl.
*G06F 12/00* (2006.01)
*G06F 12/0877* (2016.01)

(52) U.S. Cl.
CPC .... *G06F 12/0877* (2013.01); *G06F 2212/221* (2013.01); *G06F 2212/656* (2013.01)

(58) Field of Classification Search
CPC .......... G06F 12/0877; G06F 2212/221; G06F 2212/656
See application file for complete search history.

(56) References Cited

U.S. PATENT DOCUMENTS

2006/0026355 A1 2/2006 Okawa et al.
2008/0133845 A1 6/2008 Blumrich et al.
2009/0083493 A1 3/2009 Kinter
2016/0162407 A1 6/2016 Pierson et al.
2016/0349322 A1* 12/2016 Shibahara .......... G01R 31/3177

FOREIGN PATENT DOCUMENTS

KR 10-1155127 6/2012

* cited by examiner

*Primary Examiner* — Shawn X Gu
(74) *Attorney, Agent, or Firm* — Brooks, Cameron & Huebsch, PLLC

(57) ABSTRACT

Apparatuses and methods related to providing coherent memory access. An apparatus for providing coherent memory access can include a memory array, a first processing resource, a first cache line and a second cache line coupled to the memory array, a first cache controller, and a second cache controller. The first cache controller coupled to the first processing resource and to the first cache line can be configured to provide coherent access to data stored in the second cache line and corresponding to a memory address. A second cache controller coupled through an interface to a second processing resource external to the apparatus and coupled to the second cache line can be configured to provide coherent access to the data stored in the first cache line and corresponding to the memory address. Coherent access can be provided using a first cache line address register of the first cache controller which stores the memory address and a second cache line address register of the second cache controller which also stores the memory address.

24 Claims, 3 Drawing Sheets

COHERENT MEMORY ACCESS

TECHNICAL FIELD

The present disclosure relates generally to memory, and more particularly, to apparatuses and methods associated with coherent memory access.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). The number of processing resources can access data stored in the memory.

DETAILED DESCRIPTION

Figure 1:
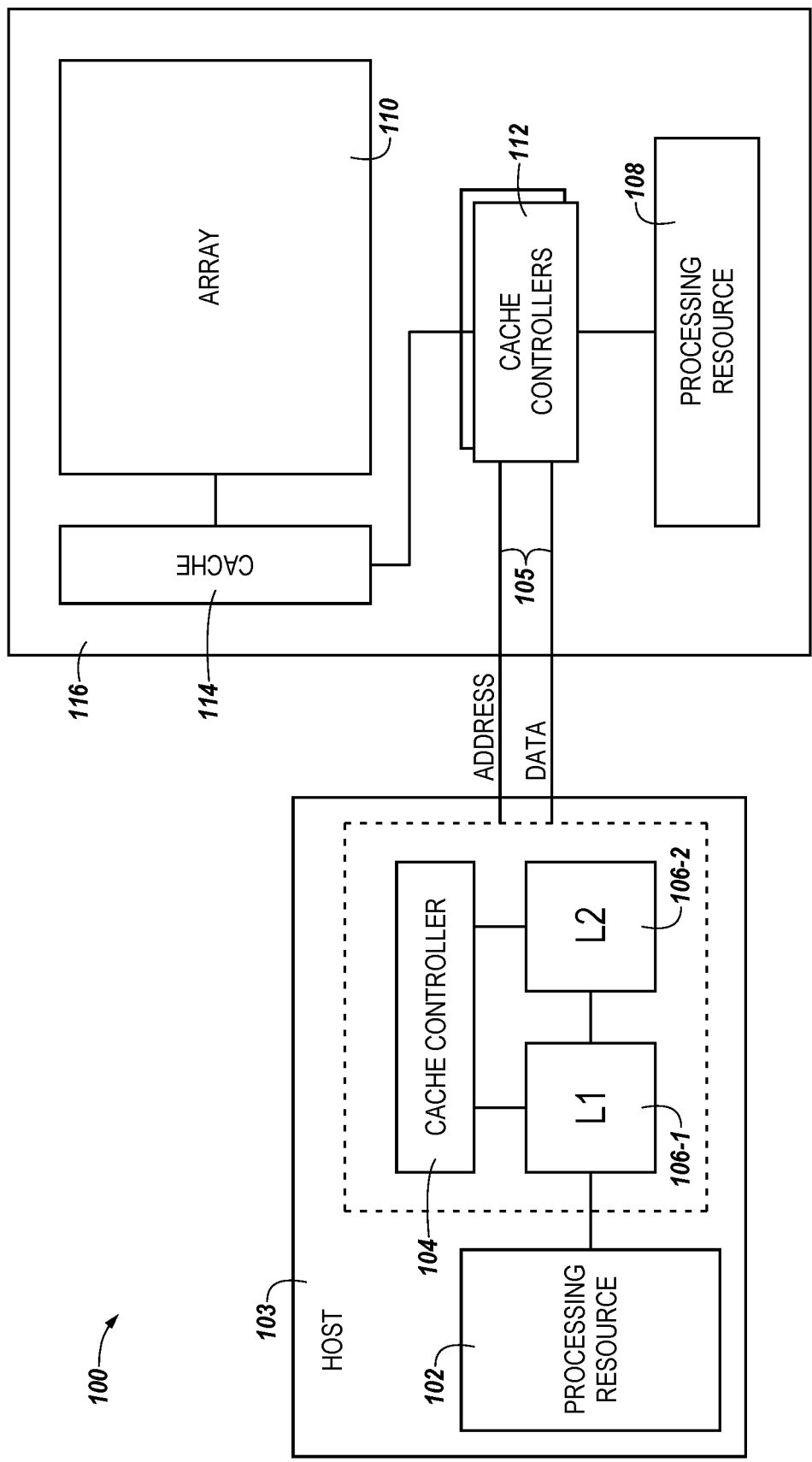
FIG. 1 is a block diagram of an apparatus in the form of a computing system including a memory system and capable of providing cache coherency for memory cache in accordance with a number of embodiments of the present disclosure.

The present disclosure includes apparatuses and methods related to synchronizing access to memory cache. An example apparatus can include a first processing resource, a first cache line, and a second cache line coupled to a memory array. The example apparatus can also include a first cache controller coupled to the first processing resource and the first cache line and configured to synchronize access to a first data stored in the first cache line with a second data stored in the second cache line. The example apparatus can further include a second cache controller coupled through an interface to a second processing resource external to the memory system and coupled to the second cache line, wherein the second cache controller is configured to synchronize access to the second data with the first data.

Computing systems can include cache as part of a host and/or a processing resource such as a central processing unit (CPU). Cache stores data to fulfil future requests for the data in a smaller duration of time than if the data is retrieved from memory. In a number of examples, cache can be part of a memory system instead of a host and/or a processing resource such as a CPU.

The cache incorporated into the memory system can be used in accessing data stored in a memory array of the memory system, where the memory array is an array of memory cells. For example, each of a plurality of processing resources that are part of the memory system can be associated with a different cache line and/or cache unit. As used herein, cache can refer to multiple cache units. A cache unit refers to a plurality of cache lines. A cache line (e.g., a cache block) describes data having a particular size that is stored in cache. The cache line size often corresponds with a data transfer size of a memory. A cache line can also refer to a physical portion of the cache (e.g., a portion of a cache unit) configured to store a block of data having the particular cache line size such that a cache line can refer to a physical portion of a cache unit storing data and/or to the stored data itself. The cache incorporated in the memory system can also be used to access data stored in the memory array from different banks of the memory array. The cache incorporated in the memory system can further be used to access data from processing resources external to the one or more banks of the memory system.

The different cache units and/or cache lines may store data having a same address. As such, different cache units and/or cache lines can store outdated data. Outdated data describes data which has been altered in a first cache line but has not been altered in a second cache line. The data stored in the second cache line can be outdated. The outdated data can also be referred to as invalid data while updated data is referred to as valid data. The cache lines storing the data may also be referred to as valid and invalid cache lines. A cache line may be valid if it stores valid data and invalid if it stores invalid data.

The data stored by different cache lines can be accessed by a plurality of processing resources. For example, a first cache line can be accessed by a processing resource internal to a bank of a memory device while a second cache line can be accessed by a processing resource external to the bank of the memory device. To ensure that the processing resources have access to valid data, one or more controllers of the cache lines can be configured to provide coherency (e.g., cache coherency) among the different cache lines of the cache corresponding to an array of a memory device.

As used herein, cache coherency refers to uniformity of data that can be stored in different cache lines (e.g., cache lines designated for access from different processing resources). For example, cache coherency ensures that changes to data corresponding to memory addresses (e.g., of an array) shared by multiple processing resources are propagated throughout a system (e.g., memory system). In this manner, cache coherency ensures that access requests (e.g., reads/writes) to particular addresses within a shared memory address space return valid (e.g., up to date) data despite the fact that invalid copies of the data corresponding to the memory addresses may exist within the memory system (e.g., within cache comprising multiple cache lines).

Coherent access can describe providing access to a coherent cache. For example, coherent access to cache lines can be described as providing valid data to different access commands provided from different processing resources, where the access commands access a same memory address. For instance, providing coherent access to a memory address corresponding to an array can result in providing valid data regardless of whether an access command was processed by a first controller coupled to a first cache line or a second controller coupled to a second cache line.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of a computing system 100 including a memory system 116 and capable of providing cache coherency for memory cache 114 in accordance with a number of embodiments of the present disclosure. The computing system 100 includes a host 103 and a memory system 116. The host 103 includes a processing resource 102, a cache controller 104, and cache 106-1 and 106-2. The memory system 116 includes a processing resource 108, a memory array 110, cache controllers 112, and cache 114. As used herein, an "apparatus" can refer to, but is not limited to, a variety of structures or combinations of structures, such as a circuit or circuitry, a die or one or more die, a device or devices, or a system or systems. For example, computing system 100, memory system 116, host 103, controllers 104 and/or 112, and/or the memory array 110 may separately be referred to as an "apparatus."

The system 100 can comprise multiple memory systems (e.g., the memory system 116) each having a number of devices corresponding thereto. Each of the devices of the memory system 116 can be, for example, a "chip" comprising multiple banks. For example, the memory system 116 can comprise a plurality of modules (e.g., dual in-line memory modules (DIMMs)).

In this example, the computing system 100 includes the host 103 coupled to the controllers 112 (e.g., cache controllers 112) via a bus 105, the controllers 112 being part of the memory system 116. The computing system 100 can be a laptop computer, personal computers, digital camera, digital recording and playback device, mobile telephone, PDA, memory card reader, interface hub, sensor, Internet-of-Things (IoT) enabled device, an on-chip application microprocessor, and/or a microcontroller, among other systems, and the processing resource 102 can be a number of processing resources (e.g., one or more processors) capable of accessing the memory 110 (e.g., via the controllers 112). The host 103 may be responsible for execution of an operating system (OS) and/or various applications that can be loaded thereto (e.g., from memory system 116 via the controllers 104 and 112).

The controller 104 may receive memory access requests (e.g., in the form of read and write commands, which may be referred to as load and store commands, respectively) from the processing resource 102. The controller 104 can determine if the memory access requests can be fulfilled using the cache 106-1 and 106-2, referred to as cache 106. If the access requests can be fulfilled using the cache 106, then the controller 104 can fulfill the requests using the cache 106. The controller 104 controls the cache 106 as shown by the dotted line surrounding the controller 104 and the cache 106.

The controller 104 can control different levels of the cache 106. For example, the cache 106-1 can be a first level of cache (L1) and the cache 106-2 can be a second level of cache (L2). Although two levels of cache are shown in FIG. 1, other examples, can include more or fewer levels of cache. The controller 104 can be a single controller that manages multiple different cache units. As used herein, a cache unit can include a grouping of cache lines. For example, the cache 106-1 can be a first cache unit and cache 106-2 can be a second cache unit both of which are controlled/managed by controller 104.

The cache 106-1 and the cache 106-2 can have a hierarchy scheme. For example, the cache 106-1 can retrieve data from the cache 106-2. The cache 106-2 can retrieve data from the memory system 116. As such, the cache 106-1 has a higher level than the cache 106-2. The controller 104, which is a single controller, can control the movement of data between the processing resource and the cache 106-1 and the movement of data between the cache 106-1 and the cache 106-2.

The data stored in the cache 106 can be transferred via the bus 105. The bus 105 (e.g., buses) can transfer data utilizing protocols. Such protocol may be custom or proprietary, and may employ a standardized protocol, such as Peripheral Component Interconnect Express (PCIe), Gen-Z, CCIX, or the like.

The bus transfers data between the host 103 and the memory system 116. The bus 105 can include a data bus and/or an address bus, among other buses such as a timing bus. The characteristics of the bus 105 are the characteristics of the data bus and/or the address bus. The bus 105 can transfer data in words referred to as packets and/or blocks which are a segmentation of a stream of data. If the data transferred by the bus 105 includes X bits of data, then the X bits can be grouped into a plurality of packets, each packet comprising Y bits where Y is less than X. The bus 105 can transfer one of the packets at a time.

There can be a timing component to the transfer of data via the bus 105. The controller 104 can synchronize the transfer of data packets with the receipt of the data packets by the cache controllers 112 and/or the processing resource 108. The synchronization can be carried out using timing information. The timing information can be provided using a timing bus (e.g., timing channel). The timing bus can transmit clock pulses to the receiver (e.g., the cache controllers 112 and/or the processing resource 108, among other possible receivers). The receiver can utilize the timing information to determine a timing associated with receiving the data. The data can be provided and received at a constant rate that corresponds to the synchronization and the timing information.

In some examples, cache coherency can be carried out without the use of timing channels. For example, the cache controller 104 and the receiver (e.g., the cache controllers 112 and/or the processing resource 108) can establish synchronization by providing a predefined baud rate. The term baud describes a common measure of the rate of data over a data bus. In some examples, the baud rate provided as bits per unit of time such as a second (bps). In some examples, the bus 105 further comprises combined address, command, and data buses or separate buses for respective address, command, and data signals.

Figure 3:
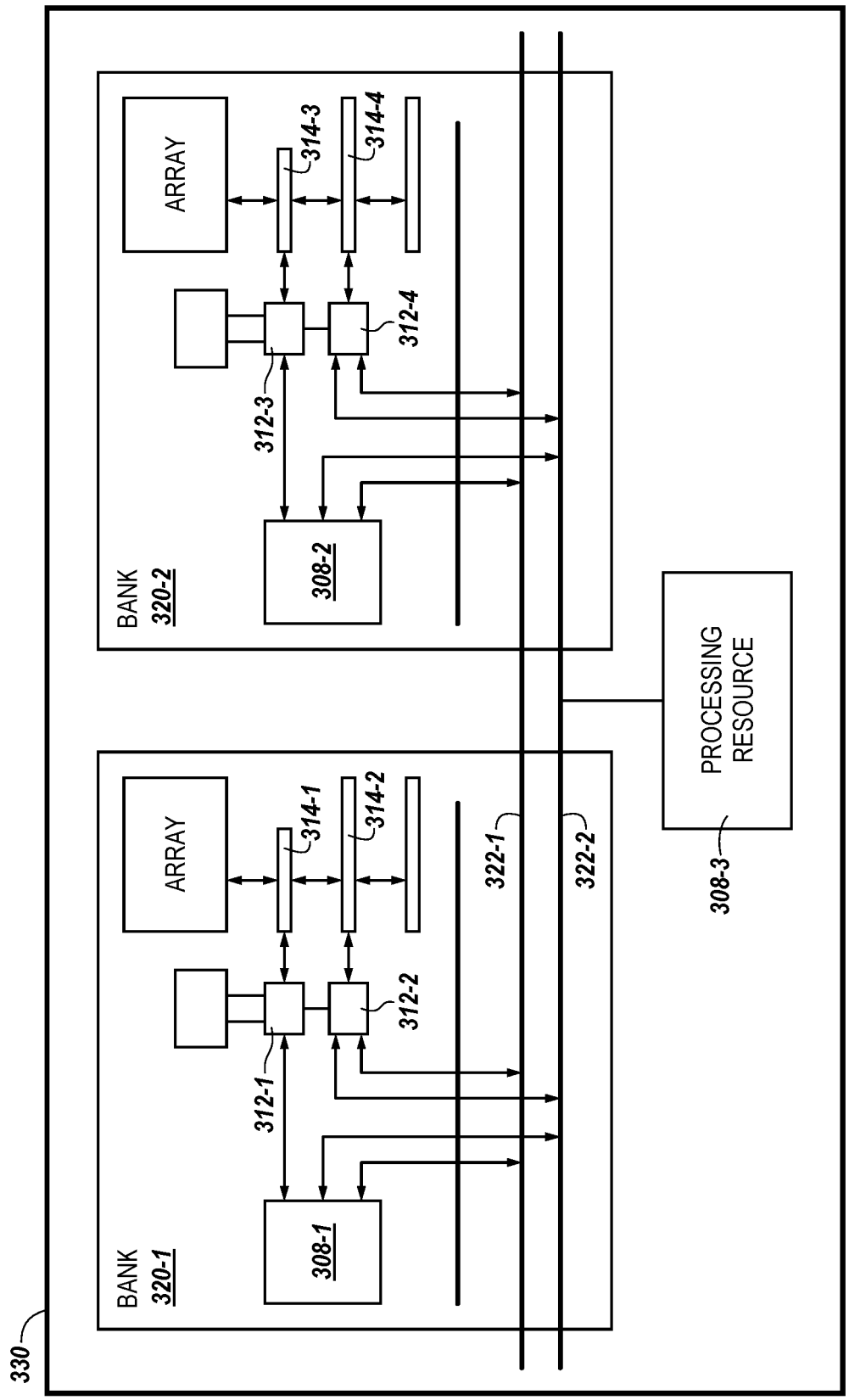
FIG. 3 is a block diagram of a device of a memory system capable providing cache coherency for memory cache in accordance with a number of embodiments of the present disclosure.

In FIG. 1, the memory system 116 shows a bank comprising an array 110, the cache 114, the cache controllers 112, and the processing resource 108. Although a single bank is shown, the memory system 116 can comprise multiple banks, each bank comprising an array, cache, cache controllers, and a processing resource as shown in FIG. 3. Although a single array 110 and a single processing resource 108 are shown, the memory system 116 can include multiple arrays 110 and/or processing resources 108. The memory system 116 can comprise the array 110 (e.g., banks) of memory cells and can comprise corresponding support circuitry (e.g., address circuitry, I/O circuitry, control circuitry, read/write circuitry, etc.) associated with accessing the array(s) (e.g., to read data from the arrays and write data to the arrays). As an example, the memory banks (e.g., memory devices) can include a number of DRAM devices, SRAM devices, PCRAM devices, RRAM devices, FeRAM, phase-change memory, 3DXP, and/or Flash memory devices. As used herein, a memory device and/or a memory system can be referred to as a memory apparatus. In a number of embodiments, the memory system 116 can serve as main memory for the computing system.

The controllers 112 can comprise control circuitry, in the form of hardware, firmware, or software, or any combination of the three. As an example, the controllers 112 can comprise a state machine, a sequencer, and/or some other type of control circuitry. In a number of embodiments, the controllers 112 may be co-located with the memory system 116 (e.g., in a system-on-chip (SOC) configuration) and/or can be part of the memory system 116. The controllers 112 can be configured to control the access to data stored in the cache 114. Each of the controllers 112 can be coupled to each other and can be coupled to a different cache unit from the cache 114. The controllers 112 can also provide coherency (e.g., cache coherency) among the different cache lines of the cache 114 corresponding to array 110. The controllers 112 can provide cache coherency utilizing a plurality of cache line address registers shared between the cache 114. The cache line address registers can be internal to the cache 114.

The processing resource 108 can also include a state machine, a sequencer, a microprocessor, and/or some other type of control circuitry, which may be implemented in the form of an application specific integrated circuit (ASIC) coupled to a printed circuit board. The processing resource 108 can be a controller such as a bank controller. A bank controller can, in some examples, perform operations on data stored in the array 110 and/or the cache 114. The bank controller can perform read operations and write operations to provide read access and write access to the cache 114 and/or the array 110. The bank controller may also perform logical operations and/or vector operations utilizing the data stored in the cache 114 and/or the array 110. The function of the cache 114 and the cache controllers 112 is further described in FIGS. 2 and 3.

Figure 2:
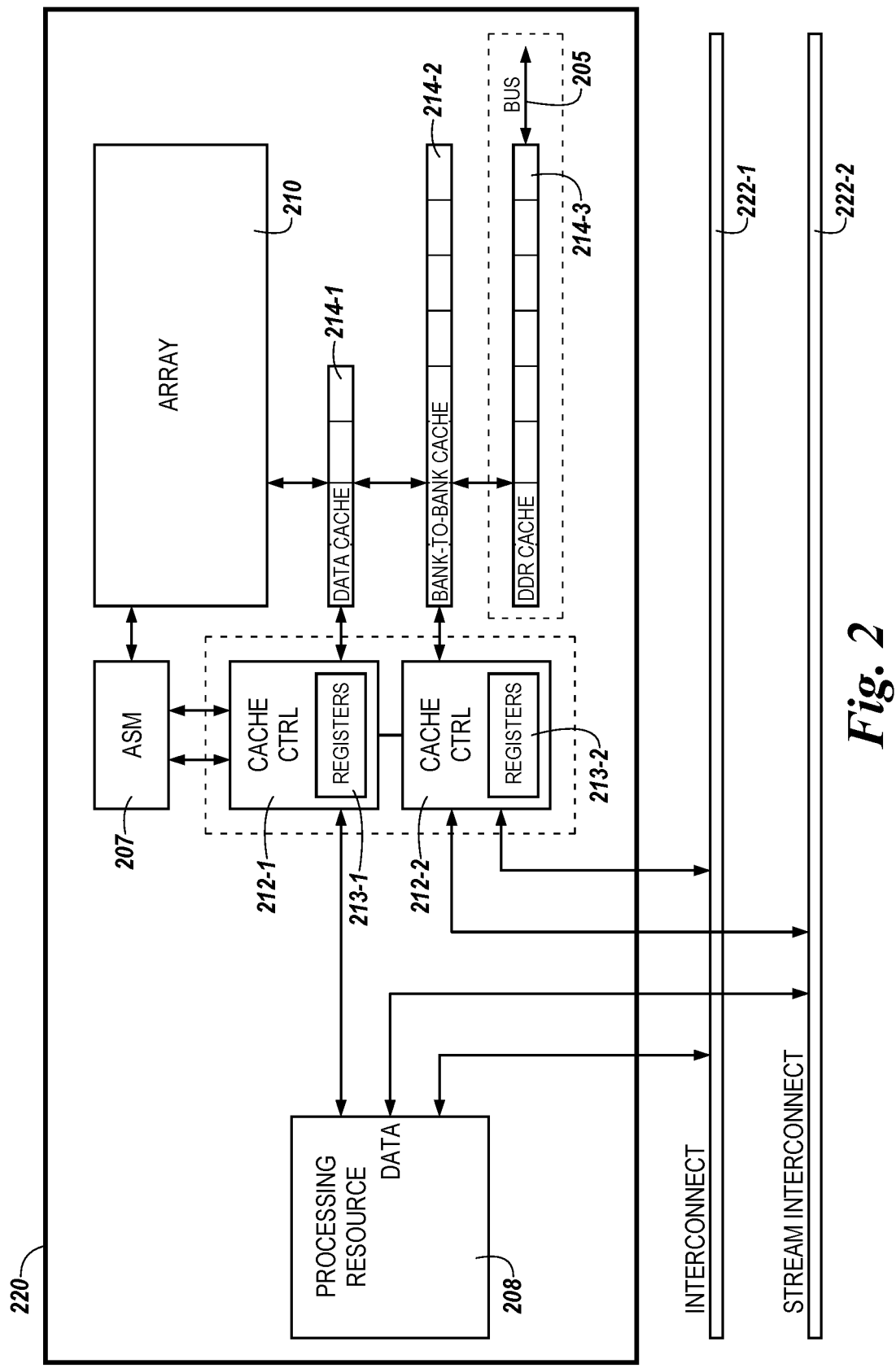
FIG. 2 is a block diagram of a memory bank capable of providing cache coherency for memory cache in accordance with a number of embodiments of the present disclosure.

FIG. 2 is a block diagram of a memory bank 220 capable of providing cache coherency for memory cache in accordance with a number of embodiments of the present disclosure. The memory bank 220 can be a bank in a memory system such as memory system 116 in FIG. 1.

The bank 220 includes a processing resource 208, an array 210, cache controllers 212-1 and 212-2 referred to as cache controllers 212, and cache 214-1, 214-2, and 214-3 referred to as cache 214. The processing resource 208, the array 210, and the cache controllers 212 are analogous to the processing resource 108, the array 110, and the cache controllers 112 of FIG. 1, respectively. The cache 214 is analogous to cache 114.

In some examples, the bank 220 can be coupled to a plurality of interfaces. The interfaces can be, for example, an interconnect 222-1 and a stream interconnect 222-2. The interconnect 222-1 and the stream interconnect 222-2 can couple the bank 220 to a plurality of different banks and/or processing resources external to the bank 220. In some examples, the interconnect 222-1 and the stream interconnect 222-2 can be an advanced extensible interface (AXI) interface and an AXI stream interface, respectively.

The interconnect 222-1 and the stream interconnect 222-2 can be different from the bus 105 in FIG. 1. For example, the interconnect 222-1 and/or the stream interconnect 222-2 can transfer streams of data without dividing the data into packets and/or words. Further, the interconnect 222-1 and/or the stream interconnect 222-2 can transfer data without relying on a timing component. For example, the interconnect interface can function independent of timing limitations.

The stream interconnect 222-2 can provide data to the cache controller 212-2. The cache controller 212-2 can store the data in the cache 214-2. The interconnect 222-1 can provide and receive data from the cache controllers 212.

The controllers 212 can provide coherent access to data stored in cache 214 and/or the array 210. For example, the controllers 212 can provide coherent access to access commands provided by processing resources (e.g., processing resource 208) internal to the bank 220 and to access commands provided by processing resources external to the bank 220. The access requests can be provided via a bus 205 analogous to bus 105 in FIG. 1, an interconnect 222-1, and/or a stream interconnect 222-2.

The cache 214-1 can be referred to a first cache unit which can correspond to cache utilized to store data accessed by the processing resource 208. The cache 214-1 can be referred to as a data cache. Each of the cache units can comprise cache lines. For example, the first cache unit (e.g., cache 214-1) comprises four cache lines in FIG. 1. The processing resource 208 can issue read operations and/or write operations to access the data stored in the cache lines of the cache 214-1. The cache 214-1 is controlled by the cache controller 212-1.

The cache 214-2 is a second cache unit which can be referred to as a bank-to-bank cache. Processing resource external to the bank 220 can utilize the cache 214-2 to store data. Processing resources external to the bank 220 can include, for example, processing resources of different banks or processing resources that are external to any bank but that are internal to the memory system of which the bank 220 is a part of. The cache 214-2 can comprise eight cache lines. However, the number of cache lines provided for each of the cache 214 is illustrative and should not be construed as limiting given that each of the cache 214 can include a different number of cache lines than those described herein. The cache 214-2 is controlled by the cache controller 212-2

The cache 214-3 is a third cache unit which can be referred to as a double data rate (DDR) cache. Processing resources external to the memory system 116 of FIG. 1 can utilize the cache 214-2 to store data. The processing resources external to the memory system 116 can include, for example, processing resources of a host such as a CPU, graphical processing unit (GPU), and/or different types of processing resources external the memory system. The cache 214-3 can be coupled to the processing resource external to the memory system via the bus 205. The bus 205 is analogous to the bus 105 in FIG. 1. In some examples, the cache 214-3 can be controlled by one of the controllers 212.

In some examples, a bank 220 can include more or less cache units than those shown in FIG. 2. For instance, a bank 220 can include three cache units or more than three cache units. Access requests can provide access to coherent cache units. For example, valid data stored in one of a plurality of different cache units can be copied to the other cache units of the plurality of cache units to service write commands and/or read commands (e.g., access commands). A bank can include multiple processing resources each of which communicates with a different cache controller coupled to different cache units. The valid data stored in one of the cache units can be copied to cache units storing invalid data to provide cache coherency. The valid data can be copied from the cache unit storing the valid data to the cache units storing invalid data if both the cache units are associated with a same memory address. The cache units can be associated with a same memory address if a cache line address register of the cache unit storing the valid data and a cache line address register of the cache units storing the invalid data store data having a same memory address.

The cache 214-1, 214-2, and 214-3 can be coupled to each other. For example, the cache 214-1 can be coupled to the cache 214-2. The cache 214-2 can be coupled to the cache 214-3. Data can be moved from any one of the cache 214 to any other of the cache 214. For example, data stored in a cache line of the cache 214-1 can be moved to a cache line of the cache 214-2. The cache 214 can also be coupled to the array 210.

The controllers 212 can store memory addresses corresponding to data stored in their respective cache lines in a plurality of cache line address registers (e.g., cache line address registers 213-1 and 213-2). The memory addresses can be stored in the cache line address registers using translation lookaside buffer (TLB) entries, where the TLB entries include the memory addresses.

Each of the controllers 212 can include a different plurality of cache line address registers 213-1 and 213-2, referred to as cache line address registers 213. For example, the controller 212-1 can comprise the cache line address registers 213-1 to store memory addresses corresponding to data stored in the cache lines of the cache 214-1. The controller 212-2 can comprise the cache line address registers 213-2 to store memory addresses corresponding to data stored in the cache lines of the cache 214-2.

Each of the cache lines of the cache 214 can be associated with a different one of the cache line address registers 213 of the controllers 212. For example, a first cache line address register of the controller 212-1 can store a memory address (es) corresponding to a first cache line of the cache 214-1, a second cache line address register of the controller 212-1 can store memory addresses corresponding to a second cache line of the cache 214-1, etc. In some instances, there can be a one-to-one relationship between the controllers 212 and the cache units corresponding to the cache 214 and between the cache line address registers 213 of each of each of the controllers 212 and the cache lines of each of the cache units.

The relationship between the controllers 212 and the cache 214 is such that the cache 214 does not have a corresponding hierarchy associated therewith. Given that in some examples each controller 212 is associated with a single cache unit of the cache 214, there is no other cache from which to develop a hierarchy. For example, the cache 214-1 does not have a higher or a lower priority and/or level as compared to the cache 214-2 and/or the cache 214-3 because the cache 214-1 has a one-to-one relationship with the controller 212-1. Likewise, the cache 214-2 does not have a higher or a lower priority and/or level as compared to the cache 214-1 and/or the cache 214-3 because the cache 214-2 has a one-to-one relationship with the controller 212-2.

Each of the controllers 212 can be coupled to the other controllers. For example, the controller 212-1 is coupled to the controller 212-2 and the controller 212-2 is coupled to the controller 212-1 such that the controllers 212 can communicate with each other. The controllers 212 can communicate with each other to share memory addresses stored in their respective cache line address registers 213. The controller 212-1 can have access to the cache line address registers 213-2 of the controller 212-2. The controller 212-2 can have access to the cache line address registers 213-1 of the controller 212-1. As such, the controllers 212 can share the cache line address registers 213.

By sharing the memory addresses stored in the cache line address registers 213, the controllers 212 can determine whether the other controllers store data corresponding to a memory address. For example, the controller 212-1 can determine whether a memory address is stored in the cache line address registers 213-2 of the controller 212-2 and the controller 212-2 can determine whether a memory address is stored in the cache line address registers 213-1 of the controller 212-1.

A cache controller from the controllers 212 can receive a read access command requesting data. The read access command can be received from a processing resource. For example, the controller 212-1 can receive a read access command from the processing resource 208. The controller 212-2 can receive the read access command from an application processing resource and/or a bank controller which are external to the bank 220.

A cache controller (e.g., cache controllers 212-1 or 212-2) can determine whether the data is stored in a cache line corresponding to the cache controller. For example, the cache controller 212-1 can determine whether the data that is requested is stored in a first cache line corresponding to the cache 214-1 by determining whether an address of the data is stored in the cache line address register 213-1 of the cache controller 212-1. The cache controller 212-2 can determine whether the data that is requested is stored in a second cache line corresponding to the cache 214-2 by determining whether an address of the data is stored in the cache line address registers 213-2 of the cache controller 212-2.

Responsive to determining that the data is not stored in the cache line corresponding to the controller, the cache controller can determine whether the data is stored in a different cache line corresponding to a different cache controller. For example, the cache controller 212-1 can determine whether the data that is requested is stored in a second cache line of the cache controller 212-2 by determining whether an address of the data is stored in the cache line address registers 213-2 of the cache controller 212-2. The cache controller 212-2 can determine whether the data that is requested is stored in the first cache line of the cache controller 212-1 by determining whether an address of the data is stored in the cache line address registers 213-1 of the cache controller 212-1. The cache controllers 212 can determine whether an address is stored in the cache line address registers 213 because the cache controllers 212 share access to their respective cache line address registers 213.

Responsive to determining that the data is stored in the different cache line, the cache controller can store the data in the cache line and can respond to the read access command by providing the data stored in the cache line. For example, the cache controller 212-1 can store the data in the first cache line and can provide the data stored in the first cache line. The cache controller 212-2 can store the data in the second cache line and can provide the data stored in the second cache line. The data can be provided to the processing resource 208 that requested the data or a processing resource external to the bank 220.

In some instances, the read access command can include a memory address of the data. The memory address can be used to identify the data that is sought. For example, the memory address can identify the data that is to be read.

Determining whether the data is stored in the cache line can further include determining whether a value stored in a cache line address register of the cache controller comprising the cache line is equal to the memory address. For example, the cache controller 212-1 can determine whether the value stored in the cache line address registers 213-1 is equivalent to the memory address. In some instances, the value can be equivalent to the memory address if the value represents the memory address and/or if the memory address can be generated from the value. In some examples, a response to the read access command can include the data stored in the cache line corresponding to the controller that received the read access command.

Determining whether that the data is stored in the different cache line can further comprise determining whether the memory address is stored in a cache line address register corresponding to the different cache controller. Responsive to determining that the memory address is stored in the second cache line address register, the cache controller can lock the different cache line corresponding to the different cache controller. For example, the cache controller 212-1 can lock a cache line corresponding to the cache 214-2 responsive to determining that the cache line is associated with the memory address via a corresponding cache line address register. The cache controller 212-2 can lock a cache line corresponding to the cache 214-1 responsive to determining that the cache line is associate with the memory address. As used herein, a cache line can be locked by preventing the cache line from being written to and/or read. For example, a cache controller 214-1 can lock write access commands from writing to the second cache line coupled to the cache controller 214-2. The cache controller 214-1 can lock read access commands, not provided by the cache controller 214-1, to the second cache line.

In some examples, the cache controller can determine whether the cache line that is to be written to is populated. A cache line can be populated if the cache line actively stores data. The cache line can actively store data if the cache line address register associated with the cache line stores a memory address of the memory array 210 or a memory address of a different memory array of a different bank. Responsive to determining that the cache line is populated, the cache controller can flush the cache line or write the cache line to a memory array 210 coupled to the cache line. The data stored in the cache line can be written to the memory array 210 if the data stored in the cache line is populated and/or if the data stored in the cache line has not been written to the array 210. Flushing data from a cache line can include deleting the data from the cache line. Data can be flushed from a cache line if the data stored in the memory array 210 is the data stored in the cache line. There is no need to write the data stored in the cache line if the data is already stored in the memory array 210.

The controller can transfer the data stored in the different cache line to the cache line by requesting a transfer of the data stored in the second cache line from the abstract state machine (ASM) 207, wherein the transfer is a direct transfer from the second cache line to the first cache line. A direct transfer of data from one cache line to a different cache line can include the transferring of data without storing the data in a different location as part of transferring the data. The ASM 207 can be coupled to the array 210 and to the cache controllers 212. For example, the ASM 207 can be coupled to the cache controller 212-1 and the cache controller 212-2, where the cache controllers 212 are also coupled to each other.

Responsive to transferring the data to the cache line, the cache controller can unlock the different cache line. The different cache line can be unlocked by allowing data to be written to the cache line and/or read from the cache line.

In some example, access to data can also include write access. A first cache controller can receive a write access command having a memory address and a first data to be written. The first cache controller can determine whether the memory address is associated with a first cache line corresponding to the first cache controller. Responsive to determining that the memory address is not associated with the first cache line, the first cache controller can also determine whether the memory address is associated with a second cache line corresponding to a second cache controller. Responsive to determining that the memory address is associated with the second cache line, the first cache controller can copy a second data stored in the second cache line to the first cache line and can write the first data to the first cache line. The first cache controller can be one of the cache controllers 212. The second cache controller can be the other cache controller from the cache controllers 212.

In some examples, responsive to determining that the memory address is associated with the first cache line, the first cache controller can store the first data in the first cache line. Responsive to determining that the memory address is associated with the first cache line, the first cache controller can determine whether the second cache line corresponding to the second cache controller is also associated with the memory address. The second cache controller can also be associated with the memory address if, for example, both the first cache line and the second cache line store data having a same memory address.

In some instances, responsive to determining that the memory address is associated with the second cache controller, the first cache controller can provide an invalidation command to the second cache controller to invalidate the second cache line. An invalidation command can include invalidate the data stored in a cache line. Invalidating data can indicate that the data stored in the cache line is not synchronized with the array 210 and that the data needs to be updated before the data can be used. The data is invalidated due to the writing of the first data to the first cache line having the memory address and due to the second write line also being associated with the memory address.

FIG. 3 is a block diagram of a device 330 of the memory system capable of providing cache coherency for memory cache in accordance with a number of embodiments of the present disclosure. The device 330 can include banks 320-1 and 320-2 referred to as banks 320. The device 330 can also include a processing resource 308-3.

The banks 320 can each include a bank controller, cache controllers, and cache. For example, the bank 320-1 includes the bank controller 308-1, cache controllers 312-1 and 312-2, and cache 314-1 and 314-2. The bank 320-2 includes the bank controller 308-2, cache controllers 312-3 and 312-4, and cache 314-3 and 314-4.

The banks 320 and/or the processing resource 308-3 can be coupled through the interconnect 322-1 and the stream interconnect 322-2. For example, the processing resource 308-3 can provide access commands to the cache controllers 312-2 and/or 312-4 through the stream interconnect 322-2. The cache controllers 312-2 and/or 312-4 can provide data to the processing resource 308-3 through the stream interconnect 322-2.

The processing resource 308-3 can be an application processing resource. The application processing resource provides application processing in contrast with display processing, wireless communications processing, and/or power management processing, among other types of processes. The banks 320 can be coupled to each other through the interconnect 322-1.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. An apparatus, comprising:
 a memory array;
 a first processing resource;
 a first cache line and a second cache line coupled to the memory array;
 a first cache controller coupled to the first processing resource and to the first cache line and configured to provide coherent access to data stored in the second cache line and corresponding to a memory address; and
 a second cache controller coupled through an interface to a second processing resource external to the apparatus and coupled to the second cache line and configured to provide coherent access to the data stored in the first cache line and corresponding to the memory address, wherein coherent access is provided using a first cache line address register of the first cache controller which stores the memory address and a second cache line address register of the second cache controller which also stores the memory address, and
 wherein coherent access is provided by, responsive to determining that the memory address is stored in the second cache line address register, locking the second cache line prior to copying the data from the second cache line to the first cache line.

2. The apparatus of claim 1, wherein the apparatus is a bank of a memory system.

3. The apparatus of claim 2, wherein the first processing resource is a bank controller.

4. The apparatus of claim 1, wherein the first cache controller and the second cache controller are further configured to provide coherent access to the data responsive to receiving a read access command and a write access command.

5. The apparatus of claim 1, wherein the second cache controller is coupled to the second processing resource through a stream interconnect.

6. The apparatus of claim 5, wherein the second processing resource is an application processing resource.

7. The apparatus of claim 1, wherein the second cache controller is coupled to the second processing resource through a host interface.

8. The apparatus of claim 7, wherein the second processing resource is a central processing unit (CPU).

9. The apparatus of claim 1, wherein the first cache controller and the second cache controller are further configured to provide coherent access to the data via a direct coupling between the first cache controller and the second cache controller.

10. A method for providing coherent data, comprising:
 receiving, at a first cache controller, a read access command requesting data from a memory address;
 determining whether the memory address is associated with a first cache line corresponding to the first cache controller by referencing a first cache line address register;
 responsive to determining that the memory address is not associated with the first cache line, determining whether the memory address is associated with a second cache line corresponding to a second cache controller by referencing a second cache line address register;
 responsive to determining that the memory address is associated with the second cache line by determining whether the memory address is stored in the second cache line address register corresponding to the second cache controller:
responsive to determining that the memory address is stored in the second cache line address register, locking the second cache line;
copying the requested data from the second cache line to the first cache line to provide data coherency between the first cache line and the second cache line; and
responding to the read access command by providing the requested data stored in the first cache line.

11. The method of claim 10, wherein the read access command includes the memory address of the requested data.

12. The method of claim 11, wherein determining whether the memory address is associated with the first cache line further comprises determining whether a value stored in the first cache line address register of the first cache controller is equal to the memory address.

13. The method of claim 12, wherein responsive to determining that the value stored in the first registers is equal to the memory address, responding to the read access command by providing the requested data stored in the first cache line.

14. The method of claim 10, wherein responsive to determining that the first cache line is populated, flushing the first cache line or writing the first cache line to a memory array coupled to the first cache line and the second cache line.

15. The method of claim 10, wherein responsive to locking the second cache line, requesting a copying of the requested data stored in the second cache line from an abstract state machine (ASM), wherein the copying is a direct transfer of the requested data from the second cache line to the first cache line.

16. The method of claim 10, wherein responsive to transferring the requested data to the first cache line, unlocking the second cache line.

17. A method for data coherency, comprising:
receiving a write access command having a memory address and a first data to be written, wherein the write access command is received at a first cache controller of a memory device;
determining whether the memory address is associated with a first cache line corresponding to the first cache controller by referencing a first cache line address register of the first cache controller;
responsive to determining that the memory address is not associated with the first cache line, determining whether the memory address is associated with a second cache line corresponding to a second cache controller by referencing a second cache line address register of the second cache controller;
responsive to determining that the memory address is associated with the second cache line:
copying a second data stored in the second cache line to the first cache line to provide data coherency between the first cache line and the second cache line; and
writing the first data to the first cache line.

18. The method of claim 17, wherein responsive to determining that the memory address is associated with the first cache line, storing the first data in the first cache line.

19. The method of claim 18, wherein responsive to determining that the memory address is associated with the first cache line, determining whether the second cache line corresponding to the second cache controller is also associated with the memory address.

20. The method of claim 19, wherein responsive to determining that the memory address is associated with the second cache controller, providing an invalidation command to the second cache controller to invalidate the second cache line.

21. A memory system, comprising:
a first bank comprising a first bank controller;
a second bank coupled to the first bank and comprising:
a second bank controller;
a first cache controller, coupled to the first bank controller, and configured to provide data coherency to a first cache line and a second cache line, with a second data stored in the second cache line, responsive to receiving a first access command from the first bank controller, wherein the first cache line is associated with the first cache controller;
a second cache controller coupled to the second bank controller and the first cache controller and configured to provide data coherency to the first cache line and the second cache line with a first data stored in the first cache line responsive to receiving a second access command from the second bank controller, wherein the second cache line is associated with the second cache controller.

22. The memory system of claim 21, wherein the first cache controller is coupled to the first bank controller through an interconnect interface.

23. The memory system of claim 22, wherein the interconnect interface transfers a stream of data.

24. The memory system of claim 23, wherein the interconnect interface functions independent of timing limitations.

* * * * *